United States Patent [19]
Metz

[11] 3,841,052
[45] Oct. 15, 1974

[54] SYSTEM FOR JOINING FURNITURE PANELS

[75] Inventor: Werner Metz, Fredeburg, Germany

[73] Assignee: Burg-Mobel Dieter Ruddies, Fredeburg, Germany

[22] Filed: May 23, 1972

[21] Appl. No.: 256,101

[30] Foreign Application Priority Data
May 29, 1971 Germany.............................. 2126955

[52] U.S. Cl..................... 52/753 J, 52/285, 52/582
[51] Int. Cl............................................. F16b 5/00
[58] Field of Search............ 287/20.92 J, 20.92 K, 287/20.92 C, 20.92 D, 20.92 E, 189.35, 287/189.36 C, 189.36 F, 20.92 Y; 52/586, 52/584, 582, 285; 16/128 R, 171; 312/111; 108/111

[56] References Cited
UNITED STATES PATENTS
| | | | |
|---|---|---|---|
| 947,655 | 1/1910 | Sullivan | 287/20.92 D |
| 2,521,279 | 9/1950 | Becker | 287/189.36 D X |
| 3,088,178 | 5/1963 | Propst | 287/20.92 E |
| 3,229,335 | 1/1966 | Thome | 287/189.35 X |

Primary Examiner—Jordan Franklin
Assistant Examiner—Wayne L. Shedd
Attorney, Agent, or Firm—Murray Schaffer

[57] ABSTRACT

A system for joining furniture, wall or similar panels in an abutting manner is provided comprising a plurality of receiving means spaced along the edges of the panels and one or more tubular fittings having mating fastener means securable with the receiving means. The tubular fittings have a square cross section the sides of which conform to the thickness of the panels and are provided with a rod extending therethrough. The fittings are selectively secured to each of the abutting panels and joined in a continuous strip or fillet by the rod.

13 Claims, 7 Drawing Figures

SYSTEM FOR JOINING FURNITURE PANELS

BACKGROUND OF THE INVENTION

The present invention relates to apparatus for joining together two and more wall panels and in particular to fittings for joining furniture panels or the like.

Sectional furniture, i.e. furniture that can be easily assembled or taken apart, such as cases or shelves are well known. Also known is furniture which can be converted to carry out different functions. In all of these, it is of prime importance to connect two or more wall panels together in either vertical or horizontal relationship. Generally fittings which are more or less complicated and expensive are used to make such connections.

In order to obtain a secure locking connection between the walls, particularly those which join at right angles, there is usually provided a separate corner strip or fillet. This corner strip has an approximate square cross section and is proportioned in accordance with the thickness of the panel. The length of the corner strip corresponds to the depth of the furniture or the length of the panel. One known corner strip construction has a continuous dove-tailed longitudinal groove on all four of its outer surfaces. Dove-tailed longitudinal spring elements are provided on the abutting ends of the panels which are inserted into the longitudinal groove of the corner strip. Thus, a single corner strip can be used to fasten panels in all four directions. The dove-tailed sides of the corner strip which are not occupied can be neatly closed off by a separate closing strip. An advantage of this construction is that the walls abutting at each other cover the connecting element. However, the connection of the walls is, especially with deep furniture, very difficult and in addition does not permanently insure connection.

It is also known to use a corner strip which has a hollow profile and which is provided on all sides with sockets for receiving screw heads. The screws are secured into the abutting surfaces of the furniture panels leaving the screw head free to be inserted in the socket. The sockets are so arranged, that the screw heads can be taken in and fastened by sliding the corner strip relative to the panels. In this fitting the firm fixing of the furniture walls in the direction of the furniture depth is somewhat better. However, relative movement can easily break the connection. A further disadvantage lies in the fact that on the unused surfaces of the corner strip the screw sockets can be seen. In order to overcome this disadvantage, it would be necessary to have corner strips of different forms requiring a large inventory of parts and a reduction in variations of construction.

The same disadvantages hold for sectional furniture, in which the corner strip is already firmly connected with one furniture wall, or in itself is a part of the furniture wall. This only reduces the number of parts, but does not overcome the basic disadvantages.

Also known are a panel-shaped furniture element, on the edges of which are provided, at regular intervals, means at right angles to each other, in which connecting elements can penetrate in cross-wise fashion to hold the members together. The connecting elements are formed as peg-like pins, which can be fastened with a locking or safety plug which is directed vertically to the pin axis. With these, the connecting elements are visible.

It is an object of the present invention to provide means for joining two or more panels which overcome the disadvantages of the prior art.

It is another object of the present invention to provide fittings for joining two or more panels together which conform to the panels, and wherein the connecting members are not visible.

It is another object of the present invention to provide fittings in which the connecting elements are contiguous and which can be decoratively provided.

These objects, others and numerous advantages will be seen from the following description.

SUMMARY OF INVENTION

According to the present invention a system for joining furniture, wall or similar panels in an abutting manner is provided comprising a plurality of receiving means spaced along the edges of the panels and one or more tubular fittings having mating fastener means securable with the receiving means. The tubular fittings have a square cross section the sides of which conform to the thickness of the panels and are provided with a rod extending therethrough. The fittings are selectively secured to each of the abutting panels and joined in a continous strip or fillet by the rod.

The receiving means in the panel edge comprise a threaded socket secured in the panel and the fastening means on the fitting comprises a fixed screw which is insertable into the socket. The sockets are uniformly spaced along the edges of the panel, and the fittings have a length equal to the distance (or a multiple thereof) between the spacings. The screw is situated in the center of one face and extends perpendicularly from it. The fittings are alternately arranged on the edges of the abutting panels so that each panel is provided with substantial connecting means, and the fittings fit together in dove-tail fashion to form a continuous corner strip across the width of the panels. Thus, two, three or even four panels may be joined together. Because the tubular fittings are made to conform to the panels, no unsightly strip, corner brace, or screws are visible.

The tubular fitting, preferably, is made of an outer square cross sectioned stock and an in circular hollow tube lying along its central axis. The hollow tube is supported by an internal network or web of radiating fins integral with the square tube. The connecting rod or holding rod is adapted to be inserted through the center tube and since the fittings conform, the rod extends through the severally arranged fittings. To secure the rod within the tubes, the end fittings are provided with caps or cover members. The rod ends and caps may be made with mating fastening means, such as screws and threaded sockets. The caps may be integrally formed on one end of the rod or on one edge of the exterior fitting. The rods may be made to telescope fit so that any desired length may be obtained.

In one suitable emobidment it is provided, that the length of a panel wall is subdivided into at least eight divisions and the length of each fitting conformingly chosen. Similarly, the number of receiving sockets for each connecting fitting is chosen as eight. With this arrangement, four panels can be connected in cross-wise fashion, wherein each panel is provided with two alternatingly spaced fittings. The connecting rod extending through the fittings secures the panels in a continuous corner strip.

In order that the fittings can be fastened securely to the abutting surfaces of the panels, the socket members are formed as a bushing insertable by screwing or impact in the panel edge. The bushing has an internal thread conforming to the screw of the connecting fitting. The rotating movement of the fitting is not lessened by its need to screw into a given socket since at least one section between two fittings fixed on the same panel remains free.

The insert bushing is provided on its outer surface with marking projections and with a slot in its interior cross-wise thereto. The bushing can be put into the abutting edge of the panel in such a way that it is aligned with all the others and that when the screw is inserted it creates expansion forces acting in the direction of the panel length. The securement of the bushing in the panel is enhanced by the marking or guide projections which grasp the panel by the screw, screwed into it. The bushing preferably, has a conically tapered gripping surface receiving the screw.

Full details of the present invention are disclosed in the following description and are shown in the attached drawings.

DESCRIPTION OF INVENTION

Figure 1:
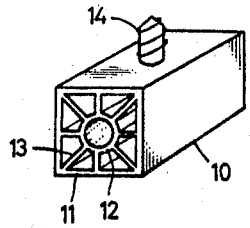
FIG. 1 is a perspective view of a connecting fitting, according to the present invention.
Figure 2:
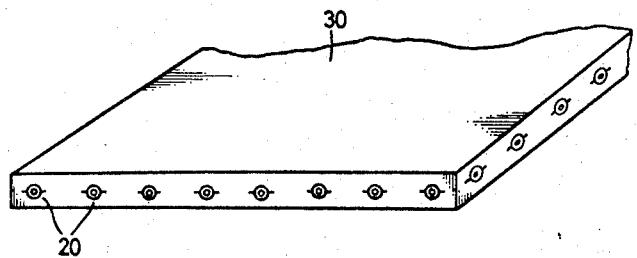
FIG. 2 is a perspective view of a furniture panel showing the receiving fastener means.

Turning now to the drawings, the connecting fitting 10 as seen in FIG. 1, comprises an outer tube 11 of generally square cross section and an inner circular tube 12 lying along its axis. The inner tube 12 is connected to the outer square tube 11 by a pluralty of radial struts 13, forming a supporting web for the inner tube 12. The inner tube 12 is adapted to receive a holding rod, described at length later, which extends outwardly into an adjacent connecting fitting, holding the two together. Extending perpendicularly from one face of the connecting fitting 10 is a screw 14, which is firmly secured, or otherwise integrally fastened by its head within the connecting fitting. The screw 14 is adapted to fit within a receiving means, namely a socket 20 secured within the edge of a panel 30 which comprises a module or furniture portion, wall section or other member of the device being assembled. Preferably, the edge of the panel 30 is provided with a plurality of receiving sockets, spaced uniformly about its periphery. Each connecting fitting 10 is of such a square cross section that its sides conform substantially to the thickness or guage of the panel 30 and of a length equal to the distance between the centers of adjacent receiving sockets 20. The connecting fitting is made to appear of the same material as the panel of the furniture, although it may be of a different materials; metals, woods and plastics are suitable.

Figure 5:
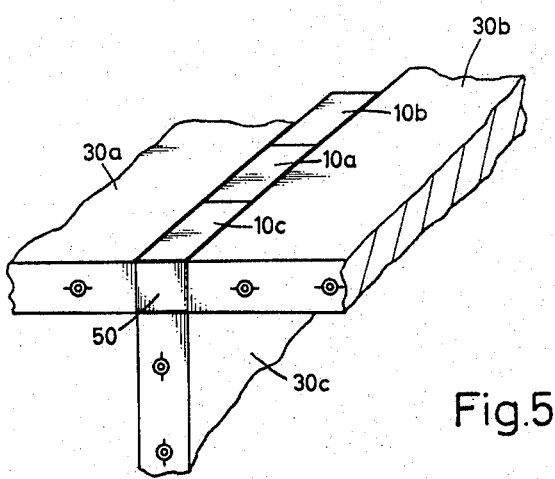
FIG. 5 is a perspective view of three panels, when assembled.

The screw 14 is located at the center of the face of the connecting fitting. Also, the first and last receiving sockets 20 on each edge are located at a distance equal to half the length of the connecting fitting, from the respective corners. In this manner, a series of connecting fittings may be sectionally arranged along the edge of the panel to form a continuous edging from corner to corner, as seen in FIG. 5.

Figure 3A:
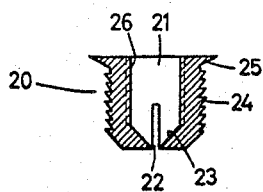
FIG. 3a is a sectional view of the receiving socket.
Figure 3B:
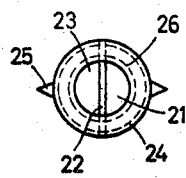
FIG. 3b is a plan view of the socket of FIG. 1.

The receiving sockets 20 are seen in detail in FIG. 3. Each comprises a cup shaped bushing insertable by impact or by screwing within a bore or hole previously formed in the panel 30. The bushing has an internal axial bore 21 open at its outer end and a diametrical slit 22. It has a conically shaped bottom 23. The outer wall of the socket 20 is provided with a plurality of barbs or teeth 24 (or a screw thread) which are adapted to engage the material of the panel and hold the socket fast preventing it from being pulled out of the bore in which it is seated. Tabs 25 extending diametrically on opposite sides of the socket, transversly to the slit 22, act to mark the position of the socket 20 in the panel edge so that each is aligned with the other and it also serves to further anchor the socket against rotation. Lastly, the inner wall of the socket is provided with threads 26 conforming to those on the screw 14. By alternately arranging fittings along the panel edge each fitting may be easily rotated into a tight fit, since the adjacent spaces allow such rotation of even the elongated fittings shown.

By aligning the fittings so that the tabs 25 are aligned along the length of the panel edge, the slits 22 are arranged cross-wise or transversly to the panel. Thus, when the screw 14 of the connecting fitting is inserted in the socket it will cause the conical bottom 23 to spread apart, wedging against the material of the panel and permanently anchoring the screw and socket. The spreading force of the screw is exerted only along the length of the panel and not transversly across its thickness, so that the possibility of splitting the panel is greatly reduced. Further, even though the screw may be rotated within the socket, the socket will not itself rotate or become unaligned and the connecting fitting 10 may be securely tightened against the edge of the panel.

By selectively spacing connecting fittings 10 along the edge of two or more panels, the panels may be connected together to form a desired shape. As seen for example in FIGS. 4 and 5 three panels 30a, 30b and 30c are fitted together to form a T shaped arrangement. The vertical panel 30c carries a connecting fitting 10c at the corner most section of its edge. The left panel 30a is provided in the second section of its edge with a second connecting fitting 10a, while the third or right panel 30b has a third fitting 10b in the third section. The fittings 0a, 10b and 10c are each respectively, screwed with the associated receiving sockets formed in the edges of their respective panels as tightly as possible, and with their side faces flush or continuous with the faces of the panels. The number of connecting fittings are repeated in alternating fashion for the length of each of the panel members 30a, 30b and 30c so that a continuous edge is formed from one corner to the next. The division of the connecting fittings by which the panels are assembled is to be done in such a manner that all the sections are occupied by one of the connecting fittings, although no two adjacent fittings on any one panel should be next to each other. They should be spaced, or at least alternated so that fittings from another panel will fit between them. Should it be desired, in the example shown in FIGS. 4 and 5 to use a vertical fourth panel every fourth section of the panels would be occupied by a connecting fitting secured to the fourth panel. Thus, a cross frame structure could be made. Similarly, the connection of two panels either in planar or perpendicular arrangement could be made by simply following the techniques previously described.

A suitable arrangement of panel sockets and fittings may be obtained by dividing each panel edge into eight sections, having one receiving socket in each section. The fittings are then made of course, to conform in length to the space between the sockets. Thus, even if four panels are joined together, each panel will have at least two fittings, insuring a tight and secure fit. The fittings can be serially spaced. Even if less than four panels are joined, the eight sectioned edge presents no problem, although selection of the spacing of the fittings must be more carefully chosen.

Figure 4A:
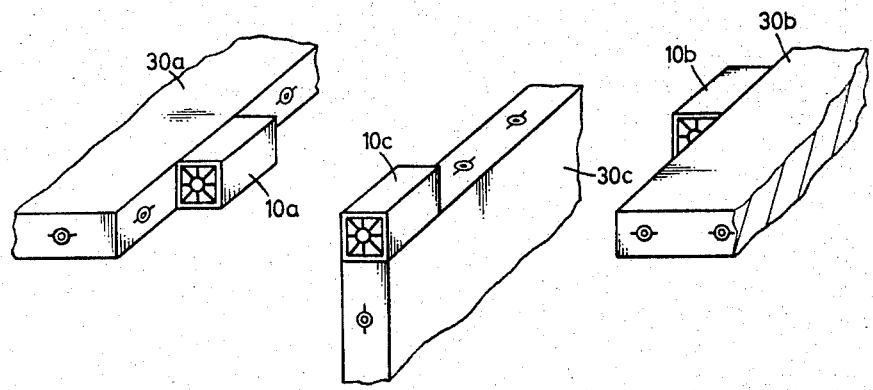
FIG. 4a is an exploded view of an assembly of panels and fittings.
Figure 4B:
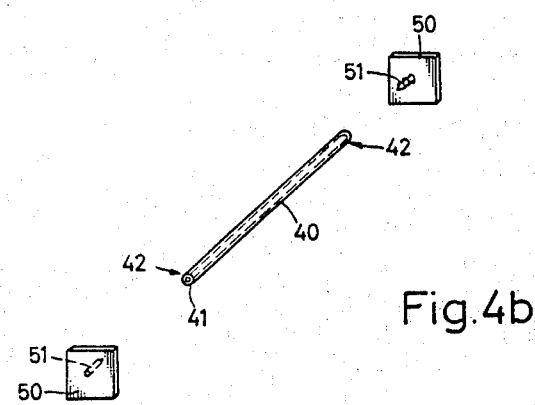
FIG. 4b is an exploded view of the connecting rod and cap.

In each instance, the connectings 10a, 10b or 10c etc., combine to form a continuous adjacently connected through -- extending corner fillet or strip in which the inner tube 12 is extended from one end to the other. A locking rod 40 as seen in FIG. 4 is inserted through the serially arranged tubes 12, to hold the connecting fittings 10 together. Preferably, the rod 40 is of a length equal to that of the panels. It is formed of a hollow tube having a threaded inner and outer end such as seen by numerals 41 and 42 respectively. Preferably, the rod is metal, although it may be made of plastic, wood or similarly suitable material.

When panels are arranged with their connecting fittings in the manner seen in FIG. 5, a smooth outer edge or fillet is provided, where the connecting rod or means for actually joining the panels is not visible. The end faces of the first and last of the connecting fittings are covered by caps 50 having a screw 51 which fits into the threaded bore 41 of the rod 40. The caps 50 not only close the ends and form a pleasing appearance, but they also hold the rod 40 firmly and securely within the connecting fittings. The caps 50 have a cross sectional shape conforming to that of the connecting fittings 10, i.e. square. If desired one one cover member can be integrally fixed to one end of the rod so that it needn't be screwed on to the rob during assembly. On the other hand, one cover may be integrally formed on an end face of the endmost connecting fitting itself. In this manner the rod may be inserted in the tube 12 from the other end and screwed to the fixed cover member. Various combinations may be used.

Furthermore, the back side of the furniture panel may be secured by an ordinary cover panel and conventional screw rather than the cover member 50 shown. The rear cover member may also be used to secure two or more panels together by conventional means, further securing the assembly.

The number of sockets and connecting fittings may be chosen as desired, and may even exceed eight in number. Furthermore, the securement between the connecting fittings and the panel may be other than a screw device. For example, a socket and plug, such as a bayonet connection may be used; a notched rod and pawl arrangement may be used; a snap fastener means may also be used. The panels may be made in selected predefined dimensions. Preferably, the panels should be of the same size or of conforming multiples of each other, with correspondingly multiple sections for the connecting fittings, so that the panels may be arranged uniformly. The holding rods may also be made in multiple lengths, and provided at one end with an outer thread and on the other end with an inner thread so that they can be telescopingly connected with each other to form an desired lengths. Other structures will be apparent to those skilled in this art.

The panels and the connecting fittings may be unitarily molded or built as unitary structures from plastics such as polystyrene or polyurethane material, in either foamed or high density form. They may also be wood or metal.

It will be seen from the foregoing that a simple, highly effective system for joining two or more panels in abutting edge relationship is provided. Basically, a plurality of fittings are required which are securably in random or selected predefined positions on the abutting edges. At least one fitting should be secured to each panel so that the connecting interlocking rod will secure the panels together. Because of the square cross section of the fittings, the panels may be arranged planar or perpendicular to each other and the same uniform smooth and continuous corner strip will be obtained in the assembly. The separable securement between fittings and panels enables variation in assembly, quick assembly and disassembly and rearrangement into a variety of forms and shapes. The modular structure of the panels, and the fittings enables furniture, stock forms and other devices to be made. Further, the modular structure of the fittings, the end caps, etc., provide a pleasing and harmonious arrangement with the panels themselves.

Since many modifications, changes and arrangements are possible the present disclosure should be taken as illustrative and not limity of the scope of the invention.

What is claimed is:

1. A system for joining two or more panel members in abutting edge relationship comprising a plurality of substantially uniform tubular fittings each conforming in outer cross section to the thickness of said panels and having an axial bore, means for securing said fittings selectively along the abutting edges of said panels, at least one of said fittings being secured on each of said panels, said fittings being selectively arranged on said abutting panels at spaced intervals in axial abutting edge relationship to provide a continuous edge across at least a portion of the width of said panels, and an elongated rod conforming to said bore extending through each of said fittings to interlock said fittings and assemble said panels in joined relationship.

2. The system according to claim 1 wherein said means for securing said fittings permits removal of said fittings.

3. The system according to claim 1 wherein said fittings and said panels are provided with lengths being a multiple of each other.

4. The system according to claim 1 wherein said fittings comprise an outer tubular body having a square cross section, and an inner tubular member lying along the longitudinal center connected to said body by a supporting web, and a threaded member extending perpendicularly outward from the center of one of the sides of said body.

5. The system according to claim 4 wherein said panels are provided with a plurality of sockets for receiving said threaded member, said sockets being spaced uniformly along the panel edge.

6. The system according to claim 5 wherein said sockets comprise a bushing insertable within said panel and having a threaded internal bore.

7. The system according to claim 6 wherein said bushings having a conically tapered bottom and a slot transversly thereto, said bushings having guide means for aligning said slot transversly to the length of the edge of said panel.

8. The system according to claim 6 wherein the exterior of said bushing is provided with barb means for retaining said bushing in said panel.

9. The system according to claim 1 wherein said rod means is provided with mating interlocking ends whereby two or more rods may be telescopingly connected in end to end relationship.

10. The system according to claim 1 including cap means for covering the ends of said fittings.

11. The system according to claim 10 wherein said cap means include fastening means for connecting said caps to the end of said interlocking rod.

12. The system according to claim 10 wherein said caps conform in shape to the cross section of said fittings.

13. The system according to claim 12 wherein said cap is secured on the exterior end of the outermost fitting.

* * * * *